US007841547B2

(12) United States Patent
Kah, Jr. et al.

(10) Patent No.: US 7,841,547 B2
(45) Date of Patent: Nov. 30, 2010

(54) ROTARY DRIVE SPRINKLER WITH FLOW CONTROL AND SHUT OFF VALVE IN NOZZLE HOUSING

(75) Inventors: Carl L. C. Kah, Jr., North Palm Beach, FL (US); Carl L. C. Kah, III, North Palm Beach, FL (US)

(73) Assignee: K-Rain Manufacturing Corp., Riviera Beach, FL (US)

( * ) Notice: Subject to any disclaimer, the term of this patent is extended or adjusted under 35 U.S.C. 154(b) by 0 days.

(21) Appl. No.: 11/563,788

(22) Filed: Nov. 28, 2006

(65) Prior Publication Data

US 2007/0119976 A1 May 31, 2007

Related U.S. Application Data

(62) Division of application No. 10/015,588, filed on Dec. 17, 2001, now Pat. No. 7,226,003.

(60) Provisional application No. 60/255,742, filed on Dec. 15, 2000.

(51) Int. Cl.
*B05B 1/30* (2006.01)
*A01G 25/06* (2006.01)

(52) U.S. Cl. ...................................... 239/569; 239/201

(58) Field of Classification Search .................. 239/96, 239/200–207, 436, 438, 443, 445, 447, 569, 239/581.1, 581.2, 582.1, 600
See application file for complete search history.

(56) References Cited

U.S. PATENT DOCUMENTS 2,601,559 A 6/1952 Riblet ......................... 239/97
2,729,504 A 1/1956 Zukas ......................... 239/97
3,323,725 A 6/1967 Hruby, Jr. .................. 239/205
3,383,047 A 5/1968 Hauser ....................... 239/206
3,539,106 A * 11/1970 Ramik ...................... 239/145
3,572,630 A * 3/1971 Mendenhall ................ 251/145
3,715,078 A 2/1973 Reynolds .................... 239/206

(Continued)

OTHER PUBLICATIONS

Letter dated Apr. 18, 2006 from John D. Bauersfeld, Esq. of Fitch, Even, Tabin & Flannery to Carl ("Chip") L.C. Kah, III of K-Rain Manufacturing Corporation, 2 pages.

*Primary Examiner*—Davis Hwu
(74) *Attorney, Agent, or Firm*—Ostrolenk Faber LLP

(57) ABSTRACT

A flow shut off or throttling valve is provided in a sprinkler nozzle housing to enable a nozzle to be changed without having to turn off a flow pressure source. The valve intersects a flow path through the nozzle housing and has an opening such that when the opening is aligned with the flow path, a flow stream can flow unobstructed through the flow path. The valve is movable between a fully open position in which the opening is aligned with the flow path and a closed position which blocks the flow stream from flowing to a nozzle disposed at an outlet passage of the flow path. The valve may be constructed to be either slidable or rotatable between the two positions, and is actuated by a gearing arrangement which is operable at the exterior of the nozzle housing. The external valve actuator may function as a physical barrier to retain the removable nozzle in the nozzle housing when the valve is open and to disengage the nozzle when the valve is closed.

6 Claims, 6 Drawing Sheets

U.S. PATENT DOCUMENTS 3,729,141 A 4/1973 Cornelius .................. 239/738
4,358,058 A * 11/1982 Bierman .................. 239/447
4,417,691 A 11/1983 Lockwood .................. 239/206
4,538,762 A 9/1985 Lemkin .................. 239/232
4,562,962 A 1/1986 Hartman .................. 239/569
4,624,412 A 11/1986 Hunter .................. 239/232
4,681,260 A 7/1987 Cochran .................. 239/240
4,729,511 A 3/1988 Citron .................. 239/205
4,796,804 A 1/1989 Weiss .................. 239/1
4,840,312 A 6/1989 Tyler .................. 239/205
4,892,252 A 1/1990 Bruninga .................. 239/205
5,086,977 A 2/1992 Kah, Jr. .................. 239/205
5,098,021 A 3/1992 Kah, Jr. .................. 239/242
5,226,599 A 7/1993 Lindermeir et al. .................. 239/205
5,234,169 A 8/1993 McKenzie .................. 239/507
5,335,857 A 8/1994 Hagon .................. 239/204
5,377,914 A 1/1995 Christen .................. 239/252
5,417,370 A 5/1995 Kah, Jr. .................. 239/242
5,465,752 A 11/1995 Higgins .................. 137/512.5
5,526,982 A * 6/1996 McKenzie .................. 239/240
5,762,270 A 6/1998 Kearby et al. .................. 239/205
5,826,797 A 10/1998 Kah, III .................. 239/394
5,975,430 A 11/1999 Larsen .................. 239/205
6,026,845 A 2/2000 Walrath et al. .................. 137/360
6,085,995 A 7/2000 Kah, Jr. et al. .................. 239/237
6,109,293 A 8/2000 Walrath et al. .................. 137/360
6,202,683 B1 3/2001 Smith .................. 137/498
6,241,158 B1 6/2001 Clark et al. .................. 239/1
6,732,950 B2 5/2004 Ingham, Jr. et al. .................. 239/205
6,802,458 B2 10/2004 Gregory .................. 239/205

* cited by examiner

ROTARY DRIVE SPRINKLER WITH FLOW CONTROL AND SHUT OFF VALVE IN NOZZLE HOUSING

CROSS REFERENCE TO RELATED APPLICATIONS

This is a divisional of U.S. patent application Ser. No. 10/015,588, filed Dec. 17, 2001, which claims priority of U.S. provisional application Ser. No. 60/255,742, filed Dec. 15, 2000.

BACKGROUND OF THE INVENTION

1. Field of the Invention

The present invention relates to a flow shut off or throttling valve in the nozzle housing of a sprinkler for limiting or preventing flow of water to the nozzle.

2. Background of the Invention

In order to achieve suitably irrigate an irregularly shaped area of land surface or near the borders of a land parcel, it may be desirable to change the distribution profile or configuration in a sprinkler to adjust the coverage range, distribution angle, etc. As a result, several different types of sprinklers have been offered to address this need.

For example, U.S. Pat. No. 3,323,725 to Hruby; U.S. Pat. No. 3,383,047 to Hauser; and U.S. Pat. No. 4,729,511 to Citron each discloses a sprinkler having various structures for restricting a flow of water through the flow path through the sprinkler. However, restriction of the flow also results in a loss in pressure of the flow exiting from the nozzle. Such limited adjustment capabilities, moreover, are frequently inadequate to provide adequate or even coverage to edges, corners, or more unusual boundaries of a parcel of land to be irrigated.

U.S. Pat. No. 5,234,169 to McKenzie, on the other hand, discloses a sprinkler which provides a removable nozzle and a camming mechanism for expelling the nozzle from the flow passage in a nozzle housing. It is thus possible to achieve a greater range of distribution profiles with the ability to change the nozzle altogether, relative to the sprinkler systems in the prior art referenced above. With this sprinkler, however, it is necessary to turn off a flow of water to the sprinkler in order to avoid getting wet during the nozzle exchange process.

Similarly, U.S. Pat. No. 6,085,995 to Kah, Jr. et al. discloses a sprinkler in which a plurality of different nozzles are provided in the nozzle housing, with each nozzle effecting a different distribution profile from the others. A nozzle selection change is easily performed by operating a selection mechanism provided on the nozzle housing. With this sprinkler, however, the plurality of nozzles are provided on a common unit, and a user may not need all of the different types of nozzles provided in the set.

In U.S. Pat. No. 5,762,270 to Kearby, et al, the disclosed sprinkler unit includes a valve provided in the flow path through the sprinkler housing for stopping the flow through the nozzle for facilitating a nozzle change. The valve, however, is physically disposed within the flow path, regardless of whether the valve is in an opened position or a closed position. Such placement of the valve requires the flow stream to flow around the valve enroute to the nozzle when the valve is open, thus resulting in increased turbulence in the flow stream and pressure loss of the flow exiting from the nozzle.

It is thus desirable to provide a sprinkler having a removable nozzle and a mechanism for stopping the flow through the nozzle at the sprinkler location, wherein the presence of the mechanism does not introduce a pressure loss to the flow exiting the sprinkler.

SUMMARY OF THE INVENTION

In a primary aspect of the present invention, a flow control and shut off valve which has a simple configuration is provided in a sprinkler, and can be actuated from the top or side of the nozzle housing to shut off or throttle the flow to one or more sprinkler nozzles. The valve throttles or shuts off a stream of water flowing through the flow path in the nozzle housing at a location upstream of the nozzle, so that the nozzle can be removed and exchanged without having to turn off the water supply to the sprinkler.

The valve can be formed as a simple and thin component which can be made of a molded plastic. The valve is disposed in the nozzle housing and can be moved in and out of a flow path through the nozzle housing using a valve controller or actuating element, which is engaged with a set of gear teeth molded onto the valve. A tight seal around the valve is achieved by the mating fit between the smooth plastic surfaces of the valve and the valve seat or by the insertion of "O" rings in the valve seat areas. The valve may be a flat or curved component and may operate in a slot or in a cavity molded into the nozzle housing. In each case, an opening in the valve is aligned with the flow path through the nozzle housing so that all the surfaces and edges of the valve are completely out of the flow path when the valve is in a fully opened position.

The flow control valve of the present invention may provide the ability to throttle or shut off the flow only to a primary nozzle while allowing the flow to continue at full pressure to at least one shorter range secondary nozzle, to thereby maintain good atomization for uniform precipitation close to the sprinkler.

In another aspect of the present invention, a nozzle retention member may be mechanically linked to the shut off valve so that when the flow shut off valve is moved to a closed position, the nozzle retention is automatically disengaged so that the nozzle may be removed and exchanged while the sprinkler remains pressurized.

The valve may be actuated by a manual shut off valve actuation ring rotatably mounted around the outside of the nozzle housing. Additionally, selectable stream break-up or deflection lugs which can be moved into the nozzle stream for range control may be mounted on the manual shut off valve actuating ring around the outside of the nozzle housing. Such an arrangement eliminates the need to include a separate stream breakup screw in the nozzle housing, as commonly used in many prior art sprinklers to secure a nozzle in the nozzle housing.

In one embodiment of the invention, the valve is preferably provided in the nozzle housing of a rotary driven sprinkler and is formed as a sleeve valve having an axis of rotation which is displaced from the rotational center line of the sprinkler to enable straightening of the flow passing between the valve and upstream of the nozzle in a lateral side passage portion of the flow path through the nozzle housing. Generally, the lateral side passage portion extends at an angle from a vertical main portion of the flow path to lead the flow path out of the nozzle housing via the nozzle.

In another embodiment of the invention, the valve is formed as a cone-shaped element and is disposed in the nozzle housing to intersect the flow passage from the side to shut off the flow through the nozzle passage.

All of the configurations of the valve allow a stream to flow fully unobstructed through the flow path with no valve pressure loss when the valve is in a fully opened position.

All of the nozzle housing valve configurations are preferably made to be operated from the top of the nozzle housing or the side of the nozzle housings and to include an indicator on the nozzle housing to indicate the opened or closed state of the valve.

Other features and advantages of the present invention will become apparent from the following description of the invention which refers to the accompanying drawings.

DETAILED DESCRIPTION OF THE PREFERRED EMBODIMENTS

Figure 2:
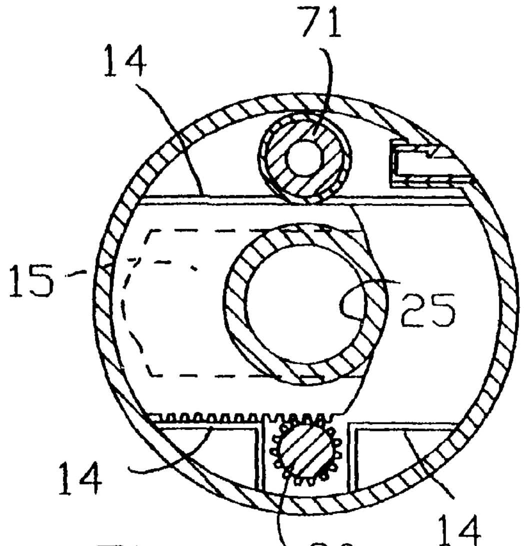
FIG. 2 is a cross-sectional view from the top through the plane II-II indicated in FIG. 1 through the nozzle housing showing a vertical portion of the flow path with a throttle valve in a fully opened position to the left in the figure and the valve gate aligned with the flow path.
Figure 3:
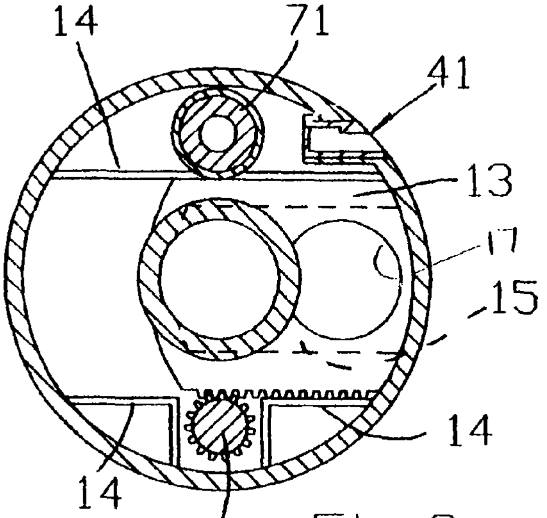
FIG. 3 is a cross-sectional view from the top through the plane II-II indicated in FIG. 1 through the nozzle housing showing a vertical portion of the flow path with a throttle valve in a fully closed position to the right.
Figure 1:
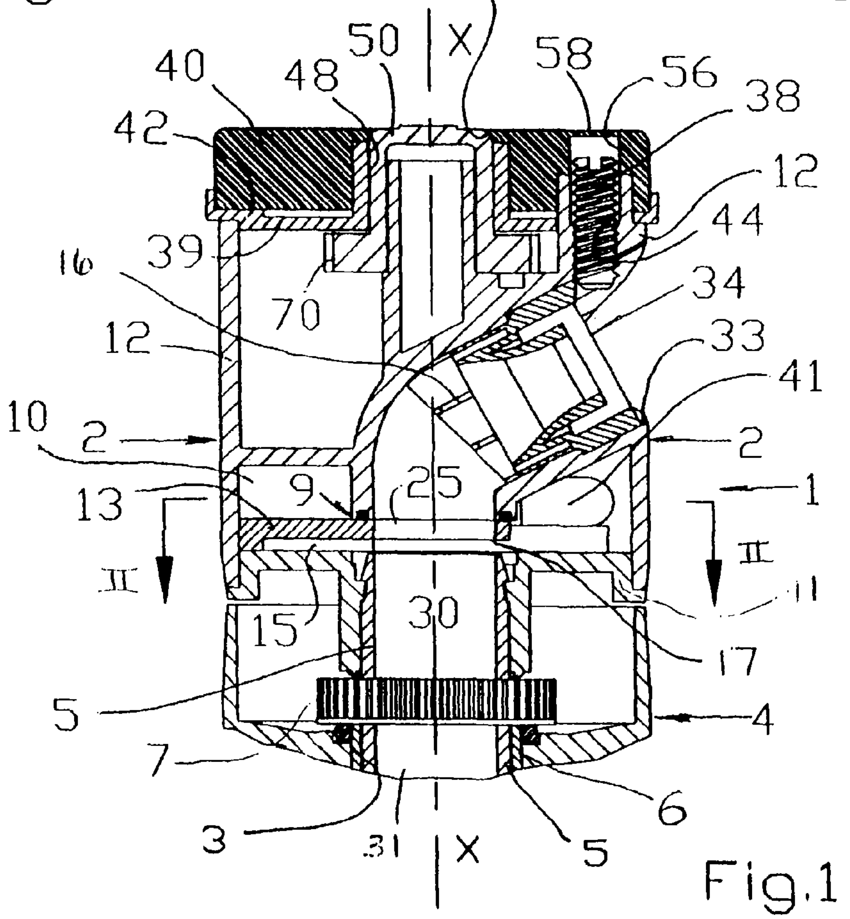
FIG. 1 is a cross-sectional view of a rotary driven nozzle housing on top of a stationary sprinkler body showing a horizontally placed flow throttling and shut off valve in the nozzle housing.

Referring to FIGS. 1-3 of the drawings, a first preferred embodiment of the present invention is shown in which an upper portion of a rotary driven sprinkler 1 includes a cylindrical nozzle housing assembly 2 mounted for rotation about axis X-X on top of a sprinkler stationary body or riser assembly 4. The riser assembly 4 has an opening 3 at its upper end in which an output drive shaft 5 is received. Output drive shaft 5 extends above the riser assembly 4 and is connected to the nozzle housing assembly 2 for rotationally driving the nozzle housing assembly.

A flow path through the sprinkler is established via a center flow passage 31 and an outlet passage 33. Center flow passage 31 is defined by drive shaft 5 and an interior cylindrical portion formed centrally in chamber 10 of nozzle housing 12. Center flow passage 31 leads into outlet passage 33 which is arranged at an angle relative to the axis X-X. As can be seen in FIG. 1, water flowing through the flow path thus flows from a water source (not shown) into the output drive shaft 5 of sprinkler body 4, out through flow opening 25 of output drive shaft 5 and into nozzle housing 12, through outlet passage 33 and exiting the nozzle housing 12 after passing through a nozzle 34 disposed in outlet passage 33 for distributing a flow of water in accordance with a profile or range enabled by nozzle 34.

Nozzle 34 is removably secured in the outlet passage 33 of the flow path in the nozzle housing 12. The removable nozzle 34 is retained in place by a range control screw 38. Furthermore, a turning and flow straightening guide 16 is provided in the flow path just upstream of the nozzle 34 in the flow passage 33.

The distribution range and/or profile of the stream exiting nozzle 34 can be controlled by range control screw 38, which is provided in an opening 44 in nozzle housing 12 which is aligned with nozzle 34 in outer passage 33. Range control screw 38 controls the distribution range by deflecting the flow stream exiting through nozzle 34, and is accessible for adjustment from the top of nozzle assembly 2.

Figure 4:
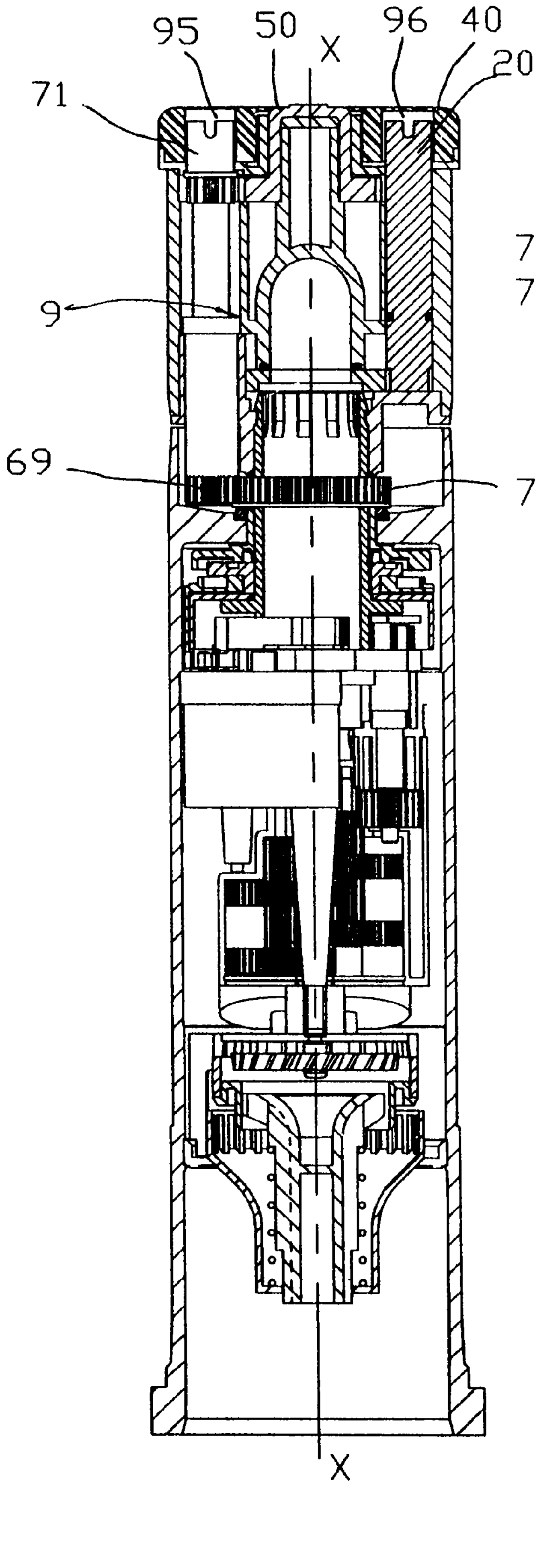
FIG. 4 is a cross-sectional view of an entire rotary driven sprinkler including nozzle housing and body showing the placement of an arc setting shaft, flow valve control shaft and components of a gear and water turbine drive.
Figure 4A:
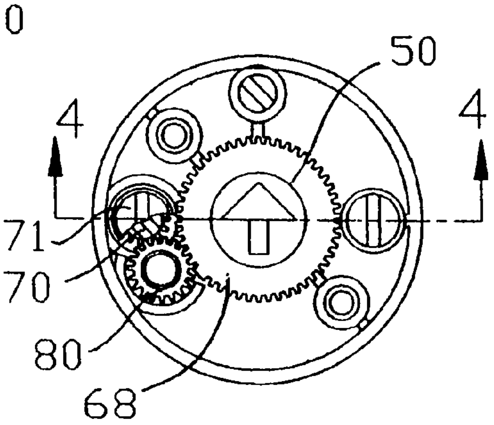
FIG. 4A is a partial sectional view from the top of the sprinkler showing the arc set, idler reversing gear and indicator member gear.

FIG. 1 also shows a second hollow shaft 6 which is concentric with output drive shaft 5 and is used for setting the arc of oscillation by rotationally positioning one arc control contact relative to the other. An arc setting gear 7 is attached to the outer hollow drive shaft 6 by serrations formed on one or both interfacial surfaces. The contacting edges between arc setting gear 7, sprinkler housing 4 and outer shaft 6 are sealed by an "O" ring to the stationary sprinkler housing 7 to prevent water from penetrating into the sprinkler housing.

can be seen in FIGS. 4 and 4A, arc setting gear 7 engages a gear 69 formed at the base of an arc set shaft 71, which can be accessed from the top of nozzle assembly 2 to set the arc of oscillation. An arc set indicator 50 is viewable at the top of nozzle assembly 2. Optionally, arc set indicator 50 can be used to also set the arc from the top of the nozzle housing as well as serving as an indicator, instead of or in addition to shaft 71 as an arc set controller. The arc set indicator 50 includes a gear 68 which is engaged with an intermediate idler gear 80, which in turn is engaged with a gear 70 of arc set shaft 71. Thus, arc set indicator 50 is connected to arc setting gear 7 via gear 69 of shaft 71, gear 70 of shaft 71, idler gear 80, and gear 68 of arc set indicator 50.

Idler gear 80 is provided between gear 70 on connecting shaft 71 and gear 68 of arc set indicator 50 for reversing the rotation direction of the arc setting indicator 50 from that of the rotation movement of the arc control contact member being set. This is an important feature since it allows the arc set shaft 71 and the indicator 50 to be turned in the same rotational direction as a change in the arc of oscillation occurs. That is, the indicator will reflect an increase in arc of oscillation by turning in the same direction that the arc set shaft 71 is being turned to effect such an increase, for example. Also, when nozzle housing 2 is rotated to its fixed side of the arc, the indicator will then point to where it will oscillate to for ease of arc setting. This is advantageous because to increase the arc of oscillation, e.g., by rotating the arc set shaft in the clockwise direction, the arc control contact that is being rotated clockwise must be shifted further counter-clockwise so that it does not trip the reversing mechanism as soon. This aspect of controlling the arc of oscillation is discussed more fully in, for example, U.S. Pat. No. 4,901,924.

Additionally, arc of oscillation setting of the output drive shaft is more thoroughly discussed in U.S. Pat. Nos. Re 35,037; 5,417,370; and 4,901,924, the disclosures of which are hereby fully incorporated by reference.

Nozzle housing assembly 2 includes a housing body 12 and a bottom plate 11 attached to housing body 12 by sonic welding or other attachment means, to thereby define a chamber 10 in the nozzle housing 12. A shut off valve 9 is formed as a simple slidable shut off piece 13 and is positioned in chamber 10 across the center flow passage 31 of the flow path through sprinkler body 4 and nozzle housing 12 at the top of output drive shaft 5. Shut off valve 9 includes a valve gate 17 formed as an opening in slidable piece 13, and is slidable between a fully opened position in which valve gate 17 is aligned with opening 25 in the flow path (FIG. 2), and a fully closed position in which valve gate 17 is moved entirely out of the flow path such that flow passage 31 is blocked at opening 25 of drive shaft 5 (FIG. 3). Slidable shut off valve 9 also includes gear teeth formed along one side edge for engaging the gear of shut off valve actuation shaft 20 (FIGS. 2, 4), whereby valve 9 is moved between the fully opened position and the fully closed position by turning shut off valve actuation shaft 20. Moreover, slidable valve piece 13 is guided by guide rails 14 formed on nozzle housing bottom plate 11, while being moved by the gear of actuation shaft 20. An "O" ring seal 30 is shown surrounding the flow passage 31 at opening 25 into the nozzle housing, to serve as a water tight seat for the valve piece 13.

A recess 15 is formed on the underside of sliding shut off valve member 13 to allow flow to continue at full pressure to a secondary stagger passage nozzle 41 which is separated from the primary nozzle, to provide water coverage fall out close-in to the sprinkler.

As further shown in FIG. 1, a recess 42 is formed at and extends around the top of nozzle housing 12. A plate 39 and a rubber cover 40 are received in recess 42, wherein the plate 39 provides rigidity for supporting the rubber cover 40 and is attached to the nozzle housing 12 by sonic welding or other attachment method. Plate 39 has openings where required, such as for exposing the arc set indicator 50, the shut off valve actuation shaft 20, etc.

Preferably, the rubber cover 40 is fixed in the recess 42 with the plate 39 by rubber holding plugs fitting into holes in the plate 39 (not shown). However, other holding devices can be used. An opening 56 in rubber cover 40 is aligned with opening 44 in the nozzle housing 12 to access the stream-deflecting range control screw 38 through a slit 58 in rubber cover 40. An "arrow" marked on cover 40 indicates radial the position of the stream outlet opening 33 so that it can be quickly determined with a glance at the top of nozzle housing assembly 2. Also, arc set indicator 50 extends through an opening 64 in the rubber cover 40 aligned with an opening 48 in plate 39 and to the top surface of the rubber cover 40.

Arc set shaft 71 and flow throttling and shut off valve actuation shaft 20, as seen in FIG. 4, extend to the top of rubber cover 40 and are accessible from the top through holes 95 and 96 formed therein. The position of the shut off valve can also be viewed and/or indicated at the top cover 40, since less than one turn is required for full opening or closing of the flow shut off valve.

Figure 5:
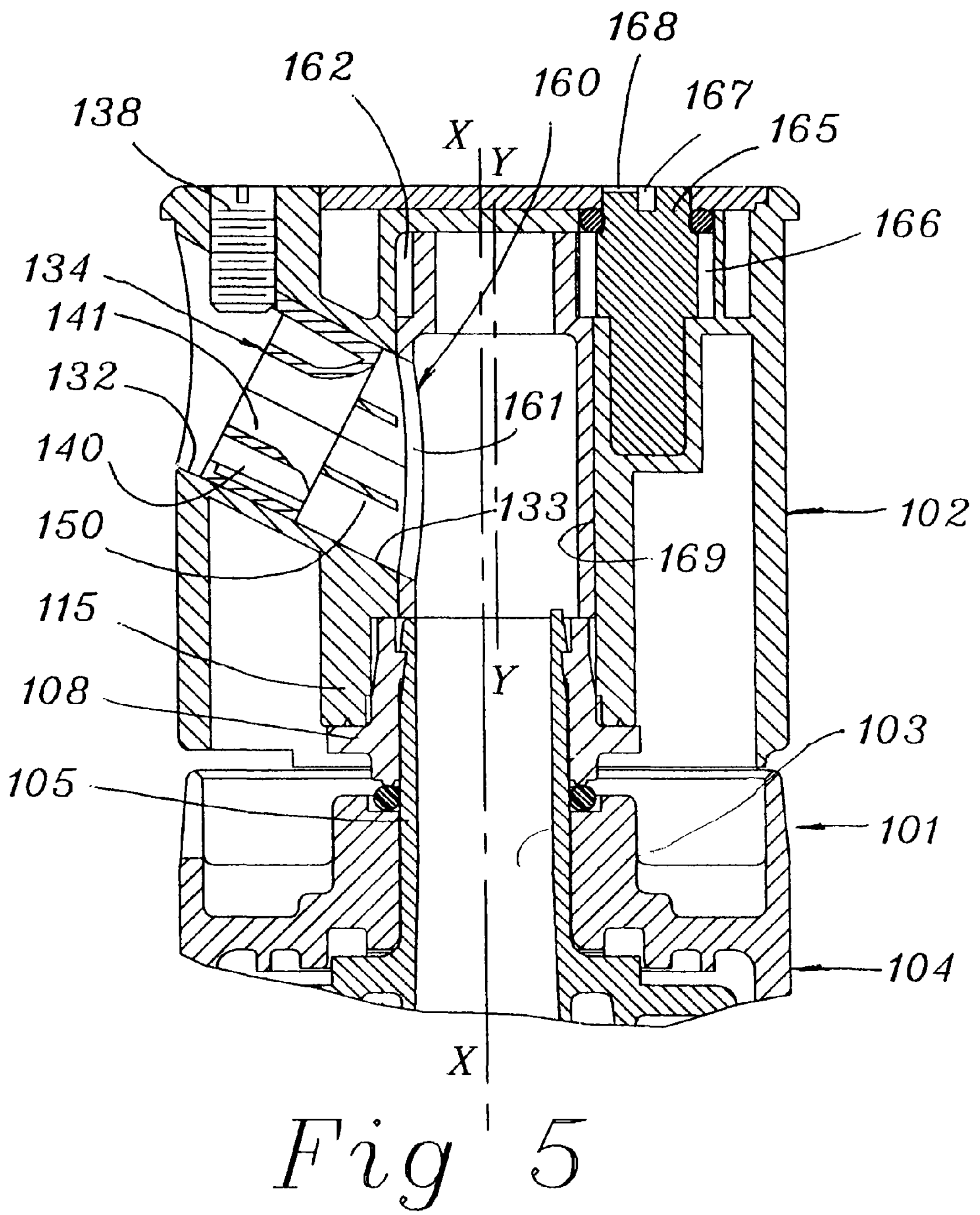
FIG. 5 is a cross-sectional view of a rotary driven nozzle housing having a rotatable sleeve valve positioned with its center line offset from the center line of rotation of the sprinkler and a valve actuation shaft accessible at the top of the sprinkler housing.

Referring now to FIG. 5, a second preferred embodiment of the present invention is shown in which an upper portion of a rotatable sprinkler 101 includes a cylindrical nozzle housing assembly 102 mounted for rotation about axis X-X on top of a stationary sprinkler body assembly 104. The stationary sprinkler body assembly 104 is connected to a source of water and has an opening 103 at its upper end through which an output drive shaft 105 exits stationary sprinkler body 104 (riser assembly) for connecting to nozzle housing assembly 102.

The output drive shaft 105 is hollow as shown in FIG. 5, and is attached to nozzle housing assembly 102 through a snap collar 108 which can be glued or sonic welded to the nozzle housing 115.

A flow path is defined from the water source through output drive shaft 105, into a central cylindrical chamber 169 formed in nozzle housing 115, and through a side passage 133 arranged at an angle relative to axis X-X and extending to a stream exit opening 132 leading out of nozzle housing 115.

A removable nozzle 134 is fitted in stream exit opening 132 of nozzle housing 115, and is held in the nozzle housing by a stream break-up or deflection screw 138. The nozzle has a primary stream exit opening 141 and optionally may have one or more secondary flow openings 140 for close-in stream break-up and coverage by the sprinkler. Flow straightener 150 is provided upstream of the nozzle for guiding a flow stream flowing through the flow path through sprinkler 101 after the change in direction from the vertical orientation of cavity 169 to the angled orientation of side passage 133.

Flow from the sprinkler body assembly 104 up through the nozzle drive shaft 105 and into the nozzle housing 115 and to the nozzle 134 is controlled by a sleeve valve 160 and can be shut off to allow removing and/or changing the nozzle 134 to a different nozzle for effecting a different flow rate or stream angle, if desired, even when the sprinkler is connected to a pressurized source of water.

The rotary sleeve valve 160 has an opening 161 at least the size of the transition area forming the junction between the central portion of the flow path and the angled side passage 133, and can be operated by turning a geared operator screw 165 to align the opening 161 in sleeve valve 160 with the side passage 133 in the nozzle housing 102.

As the secondary opening 140 of nozzle 134 is downstream of valve opening 161, flow to secondary nozzle 140 is throttled or opened and closed along with flow to the primary nozzle opening 141.

Sleeve valve 160 has gear teeth 162 formed around its top end, as shown in FIG. 5, to cooperate with gear teeth on the operator screw 165, and is configured to rotate about axis Y-Y in cavity 169. The operator screw 165 can extend to the top of nozzle housing assembly 102 so as to allow opening and closing the valve from the outside during sprinkler operation.

The gear ratio of the operator screw 165 to the sleeve valve gear 162 can be made 1:1. Since a full revolution of the operator screw 165 is not required to open and close the sleeve valve 160, an arrow head recess 168 may be provided on the top of operator screw 165 to indicate a valve open or closed position on the top of the sprinkler nozzle housing assembly 102.

Figure 6:
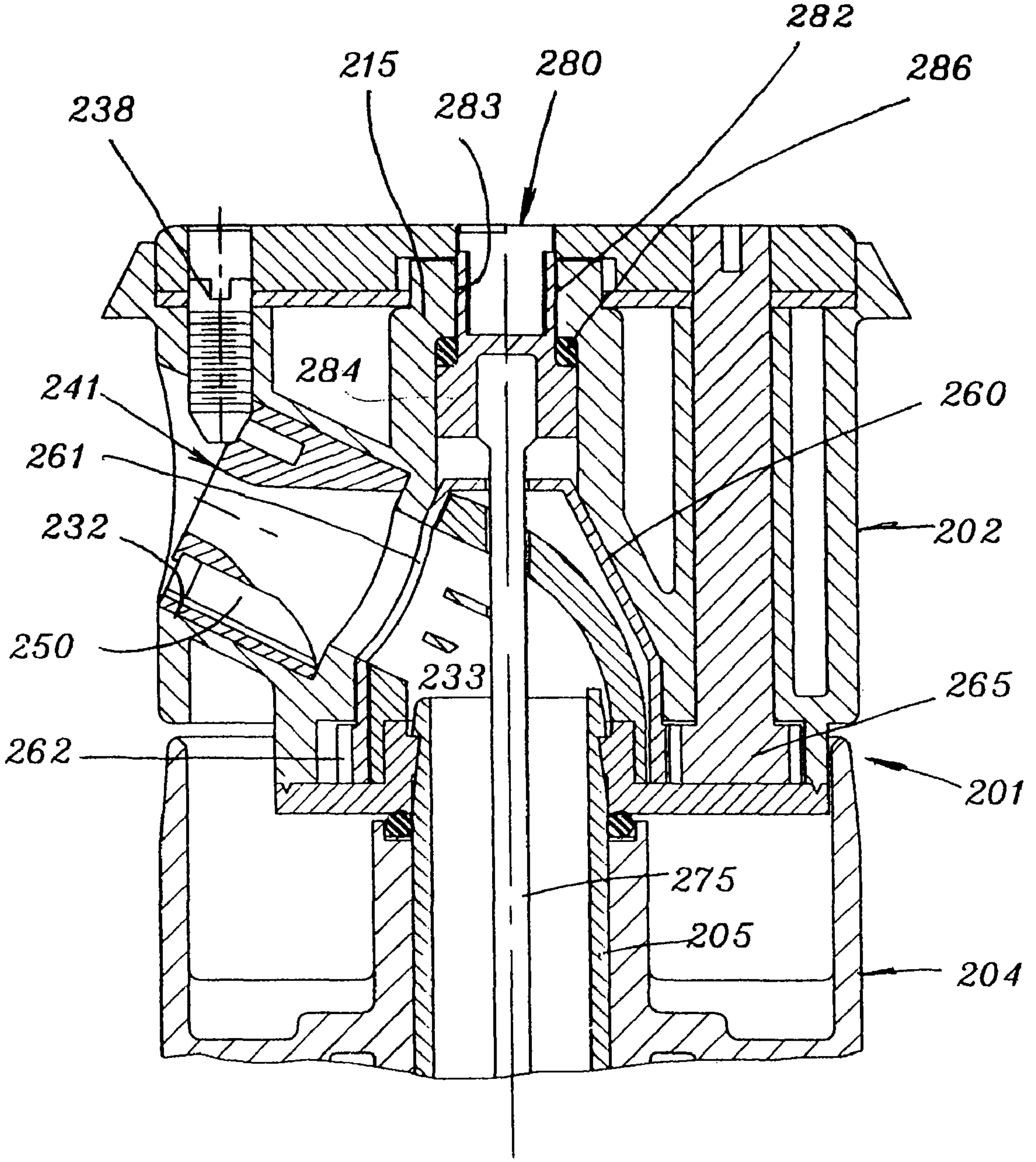
FIG. 6 is a cross-sectional view of a rotary driven nozzle housing including a cone-shaped sleeve valve intersecting the flow passage through the nozzle housing.

A third preferred embodiment of the present invention is shown in FIG. 6. This embodiment is similar to the second embodiment in that a nozzle housing assembly 202 is rotationally mounted on a stationary riser assembly 204, and includes a rotatable flow shut off valve 260 mounted in the nozzle housing around the flow path for intersecting the same. Flow shut off valve 260, however, is conically-shaped and has a valve opening 261 intersecting the flow passage 233 through the nozzle housing assembly 202, at a position between the removable nozzle 241 and a flow straightening element provided in the flow path.

Nozzle 241 may also include a secondary nozzle area 250. As in the case of FIG. 5, flow to secondary nozzle 250 is throttled or opened and closed along with flow to the primary nozzle opening.

The conically-shaped flow shut off valve member 260 is operated by gear teeth 262 formed around its bottom end and connected for external operation from the top or side of nozzle housing assembly 202 by gear 265.

In this embodiment, nozzle housing 215 includes a centrally positioned arc set shaft 275 which is concentric with the nozzle drive shaft 205 and which is connected to the top of nozzle housing 215 via an arc set indicating and setting mechanism. As shown in FIG. 6, the arc set indicating and setting mechanism includes an arc set indicating cylinder member 280 having an upper smaller section 282 rotatably fitted in a correspondingly sized cylindrical opening 283 in the nozzle housing 215.

The arc set indicating cylinder member 280 has a lower larger section 284. An "O" ring seal 286 is provided to prevent flow from leaking to the outside while allowing the arc set indicating member 280 to be turned to set a desired arc of oscillation of the nozzle housing assembly 202 by the rotary drive mechanism (not shown) housed in the sprinkler body housing assembly 204. Such an arc set control mechanism is shown and described in U.S. Pat. No. 4,901,924, issued Feb. 20, 1990 and U.S. Pat. No. 5,417,370, issued May 23, 1995, the disclosures of which are incorporated herein by reference as though fully set forth.

Figure 7:
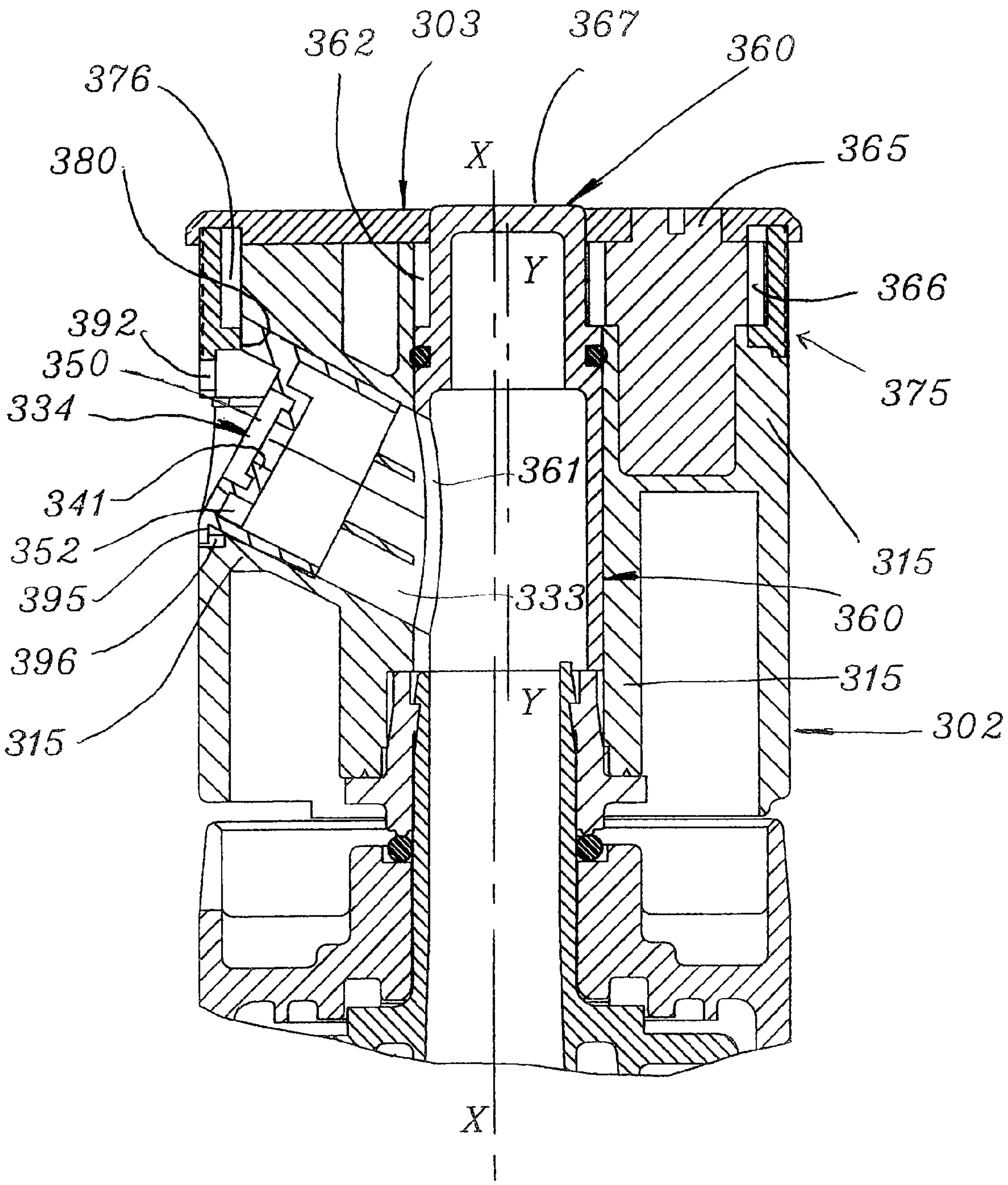
FIG. 7 is a cross-sectional view of a rotary driven nozzle housing with a rotatable sleeve valve connected through an idler gear to a ring gear around the outside circumference of the upper nozzle housing, wherein the ring gear has a serrated outside circumference to facilitate manual operation thereof.
Figure 8:
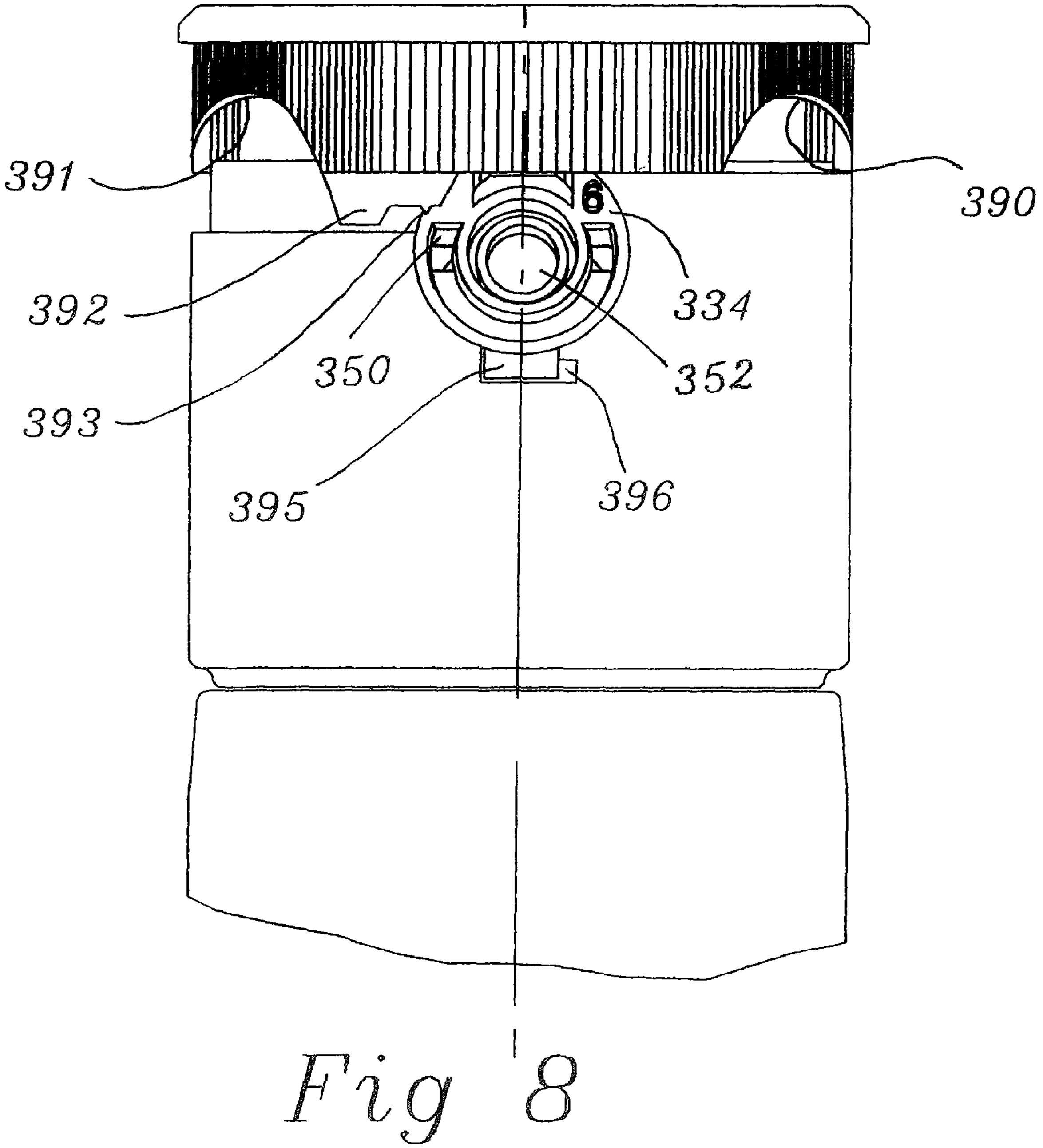
FIG. 8 is an elevational view of the nozzle housing of FIG. 7 and showing the ring gear as having structure configured to retain or release the changeable nozzle in the nozzle housing. Also shown are selectable stream break-up lugs that can be moved into the stream by further rotation of the ring beyond a position at which the flow valve is opened. A nozzle alignment and removal lug is shown on the bottom of the nozzle.

FIGS. 7 and 8 show a fourth preferred embodiment of the present invention, which includes the nozzle housing assembly and flow shut off valve described above in connection with the embodiment shown in FIG. 5. The fourth embodiment is a variant of the second embodiment in which a removable nozzle 334 is now retained at 380 in the nozzle housing assembly 302 by a rotatable nozzle retention and flow shut off control ring 375 around the outside of the cylindrical nozzle housing 315.

Here, nozzle 334 includes a primary opening 350 and one or more secondary openings 352, again downstream of a rotary shut off and throttle valve 360 described below.

The nozzle retention and flow shut off control ring 375 as shown in FIG. 8 has recesses 390 and 391 which enables nozzle 334 to be removed from nozzle housing 315 when control ring 375 is rotated so that one of recesses 390 and 391 is aligned over nozzle 334. When neither of recesses 390 and 391 are aligned with nozzle 334, control ring 375 forms a barrier to thereby retain nozzle 334 in the nozzle housing 315 against the water flow pressure forces.

The nozzle retention and flow shut off control ring 375 is connected to the rotary sleeve valve 360 by gear teeth 376 formed around the inside circumference of the nozzle retention and flow shut off ring 375. Gear teeth 376 cooperate with teeth 366 formed on geared operator screw 365, which teeth 366 are in turn connected to teeth 362 of the rotary sleeve valve 360 for rotating the sleeve valve to align opening 361 formed in the barrel of the sleeve valve 360 with flow passage 333 in the nozzle housing 315.

As previously described with respect to the embodiment of FIG. 5, such arrangement opens and closes off a flow to the removable nozzle 334.

Because control ring 375 has a greater diameter than that of sleeve valve 360, the inner circumference of control ring 375 is capable of accommodating more gear teeth 366. For example, a 40° rotation of the control ring 375 may achieve a 120° rotation of the rotary sleeve valve 360. This is more than enough to rotate the rotary sleeve valve 360 to fully open or close flow to the removable nozzle 334. Preferably, therefore, rotary sleeve valve 360 has a barrel top 367, as shown in FIG. 7, which is exposed at the top 303 of nozzle housing assembly 302 to directly indicate the position of flow shut off valve 360, i.e. whether the valve is open or closed or at a position in-between.

A stream deflection lug 392 and a stream break-up lug 393 are shown in FIG. 8 as elements attached to the rotatable nozzle retention and flow shut off control ring 375.

Teeth 376 around the inside diameter of control ring 375 may be omitted beyond a rotational position of the control ring 375 in the counter-clockwise direction, as shown in FIG. 8, for example, at which the flow shut off valve 360 is fully opened, and beyond the rotational position in the clockwise direction at which the flow shut off valve 360 is fully closed. This will allow the ring to continue to be rotated to the right (counter-clockwise) once the flow shut off valve 360 is fully opened to enable a full stream to flow to the nozzle, which thereby enables other functions to be associated with the control ring 375, such as mounting the flow break-up lug 393 or flow deflection lug 392 on the control ring 50. The additional functional features may then be rotated to intercept the flow stream from the nozzle 334 in the primary flow opening 341 to produce the desired stream modification results.

Also, continued rotation of the nozzle retention and flow shut off control ring 375 to the right (counter-clockwise) beyond the fully opened position of valve 360 will bring recess 391 in the ring 375 into alignment with nozzle 334. Since the gearing for closing the flow shut off valve 360 has been omitted for this portion of the control ring 375, the valve 360 is still open such that when recess 391 is moved into alignment with nozzle 334, the flow pressure can be used to blow the now unrestrained nozzle out of the nozzle housing 315 so that another nozzle configuration maybe installed.

Upon rotating the control ring 375 back to the left (clockwise) so that teeth 376 around the inside surface of ring gear 375 again engages teeth 366 of operator screw 365, flow shut off valve 360 will again be rotated towards the closed position. This arrangement is configured so that when recess 390 is aligned with nozzle 334, no flow or pressure is present in outlet passage 333 in the nozzle housing so that nozzle 334 may be removed for cleaning or substitution with a different nozzle, for example.

After insertion of a new nozzle or re-insertion of the one removed, control ring 375 may be again rotated to the right (counter-clockwise) in which nozzle 334 is retained in the nozzle housing 315 by edge 380 of the ring 375, such as the position shown in FIG. 8, wherein continued rotation of ring 375 will re-open flow shut valve 360 by aligning flow opening 361 in the valve 360 sleeve with flow passage 333 in the nozzle housing 315.

As shown in FIGS. 7 and 8, the removable nozzle 334 preferably includes an alignment and removal lug 395 at the bottom of the nozzle 334. A recess 396 with sloped sides is formed in the nozzle housing 315 to cause nozzle 334 to be properly set and in the same position each time a nozzle is just installed into the nozzle housing side passage 333. Also, a tool may be inserted into recess 396 behind the alignment and retention lug 395 to manually pry or pull the nozzle 334 out from the nozzle housing 315 when the nozzle is not retained by the ring 375. As previously described, the nozzle 334 may be blown out with the ring 375 positioned with recess 391 aligned with the nozzle, if desired.

Although the present invention has been described in relation to particular embodiments thereof, many other variations and modifications and other uses will become apparent to those skilled in the art. For example, although the present invention is described above as being preferably used in rotary driven sprinkler, it is noted that the present invention may also be useful in stationary sprinklers or sprinklers having a non-rotational spray pattern. It is preferred, therefore, that the present invention be limited not by the specific disclosure herein, but only by the appended claims.

What is claimed is:

1. A sprinkler assembly, for receiving a supply of water and directing water therefrom, comprising:

a nozzle housing having a flow path formed therethrough for directing a flow of water received in the sprinkler assembly and a water stream outlet through which water flowing through the flow path exits the sprinkler assembly;

a primary nozzle removably mounted in the stream outlet for distributing water from the sprinkler assembly;

a secondary nozzle provided in the nozzle housing for distributing water from the sprinkler assembly at the same time as water is distributed from the primary nozzle; and a valve for throttling or shutting off flow to said primary nozzle while allowing water to continue to flow to the secondary nozzle, wherein the valve is a slidable gate having a flow opening and movable between an open position in which the flow opening is aligned with the flow path through the nozzle housing, and a closed position in which the flow path is blocked by the slidable gate.

2. The sprinkler assembly according to claim 1, wherein the valve can be actuated from the exterior of the nozzle housing.

3. The sprinkler assembly according to claim 1, wherein the closed position of the valve gate blocks the flow path in the nozzle housing upstream of position therein of the primary nozzle.

4. The sprinkler assembly according to claim 1, further comprising a flow throttle controller including a gear, wherein the valve gate includes gear teeth along a side thereof for cooperating with the gear of the flow throttle controller, such that the valve gate is moved between the open position and the closed position by rotating the flow throttle controller.

5. The sprinkler assembly according to claim 4, wherein the flow throttle controller can be actuated from the exterior of the nozzle housing.

6. The sprinkler assembly according to claim 1, further comprising an indicator provided on the nozzle housing for indicating an open or closed state of the valve.

* * * * *